United States Patent [19]
Buckalew

[11] Patent Number: 5,459,664
[45] Date of Patent: Oct. 17, 1995

[54] DIESEL GOVERNOR TESTER

[76] Inventor: Robert Buckalew, 520 S. Bradford Ave., West Chester, Pa. 19382

[21] Appl. No.: 156,296

[22] Filed: Nov. 23, 1993

Related U.S. Application Data

[63] Continuation-in-part of Ser. No. 793,995, Nov. 18, 1991, abandoned.

[51] Int. Cl.⁶ .......................... G01M 15/00; F02M 37/04
[52] U.S. Cl. .................. 364/431.01; 364/431.05; 123/357; 73/119 A
[58] Field of Search .............. 364/431.01, 431.02, 364/431.07, 431.05, 424.03, 565, 551.01, 57.01; 73/116, 119 A, 168, 117.1, 118.1; 123/319, 357, 364, 379; 324/160, 161, 163

[56] References Cited

U.S. PATENT DOCUMENTS

| | | | |
|---|---|---|---|
| 3,867,918 | 2/1975 | Williams et al. | 123/139 E |
| 4,206,634 | 6/1980 | Taylor et al. | 73/119 A |
| 4,365,298 | 12/1982 | Sibley et al. | 364/426 |
| 4,387,589 | 6/1983 | Larson | 73/119 A |
| 4,412,290 | 10/1983 | Pannier | 364/424.1 |
| 4,423,485 | 12/1983 | Sami et al. | 364/431.05 |
| 4,493,303 | 1/1985 | Thompson et al. | 123/357 |
| 4,502,437 | 3/1985 | Voss | 123/357 |
| 4,557,140 | 12/1985 | McFarland | 73/114 |
| 4,572,131 | 3/1986 | Hashimoto et al. | 123/357 |
| 4,669,436 | 6/1987 | Nanjyo et al. | 123/357 |
| 4,708,112 | 11/1987 | Nanjyo et al. | 123/357 |
| 4,709,335 | 11/1987 | Okamoto | 364/431.05 |
| 4,785,771 | 11/1988 | Ibuki et al. | 123/179 L |
| 4,790,277 | 12/1988 | Schechter | 73/119 A |
| 4,881,404 | 11/1989 | Siegl | 73/116 |
| 4,903,669 | 2/1990 | Groff et al. | 123/478 |
| 5,038,879 | 8/1991 | Naito et al. | 180/179 |
| 5,237,975 | 8/1993 | Betki et al. | 123/497 |
| 5,284,119 | 2/1994 | Smitley | 123/497 |

*Primary Examiner*—Kevin J. Teska
*Assistant Examiner*—Tan Nguyen

[57] ABSTRACT

Method and apparatus for testing diesel engine governors away from an engine on a test bench, including an electric drive for driving a governor and an associated fuel pump at a variable speed rate which variable speed rate is controlled with an electrical signal generated by a transducer connected to the governor. The signal is applied to the drive through a feed back loop. In this manner variations in the governor output control the drive and consequently the fuel pump delivery rate in a manner that realistically simulates the actual performance of the governor when the governor and fuel pump are mounted on a diesel engine.

15 Claims, 5 Drawing Sheets

DIESEL GOVERNOR TESTER

CROSS REFERENCES TO RELATED APPLICATIONS

This is a continuation in part application of U.S. patent application Ser. No. 07/793,995 filed Nov. 18, 1991, now abandoned.

BACKGROUND OF THE INVENTION

1. Field of the Invention

This invention relates to a method and associated apparatus for testing internal combustion engines, and more particularly to a method and apparatus for testing fuel pump governors for use on diesel engines.

2. Description of Related Art

Internal combustion diesel engines typically use a fuel delivery pump whose delivery rate is controlled by a governor. Further more, many modern diesel engines use a combined fuel injection pump and governor assembly. Since both the pump and the governor are driven by the engine when the pump/governor is operating on the diesel engine, there is a dynamic interactive (closed loop) relationship between the governor throttle (speed control lever) position and the engine speed. For example, when the throttle lever is moved from one setting, i.e. the idle position, to a second setting, i.e. a position known in the trade as the high idle position, the engine speed in revolutions per minute, (RPM) increases until a balanced point is reached between the engine speed and the governor speed setting.

Testing of governors is needed for the proper operation of the fuel pump and as a consequence the diesel engine. Testing may be necessary both for adjusting a new governor/pump combination to specifications given by an engine manufacturer, and to determine whether a new or repaired governor and associated pump are operating properly.

Testing is presently done on test benches which are designed to drive a pump and associated governor and to measure the fuel volume or quantity delivered by the pump for different preset pump speeds and throttle positions. The test benches typically include a variable speed motor, means to set and read out the motor RPM, means to connect a pump and associated governor on to the test bench and the drive motor, and means to supply fuel to the pump and to measure the fuel quantity or volume delivered by the pump as a quantity of fuel per a predetermined number of pump strokes.

The currently available test benches perform the tests by averaging fuel delivery by the pump at given speeds. However, averaging the fuel delivery can average out instantaneous fluctuations in the delivery which may cause engine speed instability.

Test benches available today simply allow to set the pump and governor rotation at a given RPM speed and adjust the governor for an average fuel delivery at that speed. This situation however does not give performance information indicative of the system operation when mounted on an actual engine, since when the equipment is mounted on the test bench the pump/governor RPM are fixed by the setting of the driving motor on the bench, while when the governor and associated pump are mounted on an actual operating engine, both the governor and pump are driven by the engine and the engine RPM are a function of the pump/governor setting and performance. Fuel delivery fluctuations for any reason, including governor malfunction or improper setting will result in speed changes of the engine and further changes in the governor response. This complex interaction is not tested with today's test equipment.

Additionally throttle lever position has no effect on the injection pump test bench speed as it does when operating on the diesel engine because the current benches set such speed at a fixed rate by the setting on the drive motor.

Current test benches permit idle, high idle, rated speed and other speed adjustments but such adjustments are done by measuring average fuel delivery rather than direct speed settings.

Thus there is still a need for a testing method and apparatus that will permit testing of fuel pump governors in a way that simulates the effect of governor control on engine speed and allow testing governors for full-load speed, peak torque speed, and part throttle speed, as well as other governor parameters such as sensitivity, stability and speed droop.

SUMMARY OF THE INVENTION

It is an object of the present invention to provide a method for testing for malfunction, measuring, verifying and adjusting operating parameters when necessary, of a diesel engine governor associated with a fuel pump having adjustable fuel delivery, the method comprising the steps of:

(1) connecting said fuel pump and associated governor to a means for driving said pump and associated governor;

(2) operating said means for driving said pump and governor in a first, preselected, direct driving mode, and adjusting said governor to set the fuel delivery of said pump in accordance with a preselected specification, to establish at least one set point;

(3) deriving a first electrical signal indicative of said at least one set point;

(4) storing said first electrical signal;

(5) operating said pump in a second feedback mode by:
  (a) continuously deriving a second electrical signal indicative of the instantaneous fuel delivery through said pump;
  (b) comparing said first and second signals to produce an error signal;
  (c) using said error signal to automatically adjust the means for driving said pump;

(6) Using said automatic adjustment of the means for driving said pump and/or said error signal to diagnose a malfunction in said governor.

The above method may be practiced using a plurality of set points established and stored in the memory, said plurality of points corresponding to a plurality of operating specifications for different operating conditions of the fuel pump or it may be practiced using only a single set point for testing the governor for a plurality of different operating situations corresponding to different demands on said pump.

It is a further object of this invention to provide an apparatus for testing a diesel engine governor associated with a fuel pump having adjustable fuel delivery and able to be driven at variable speeds, comprising:

(1) Variable speed pump driving means for driving said fuel pump and associated governor, and means for connecting said fuel pump and governor to said pump driving means;

(2) means for varying the speed of the pump driving means connected to said pump driving means comprising:
(a) means for directly varying the speed of the pump driving means,
(b) means for varying the speed of the pump driving means through a feed back loop, and
(c) switching means connected between said pump driving means and said means for directly varying the speed of the pump driving means and said means for varying the speed of the pump driving means through the feed back loop, for selectably connecting the pump driving means to either the means for directly varying the speed of the driving means or to the means for varying the speed of the pump driving means through the feed back loop;

(3) the feed back loop comprising:
(a) means to generate a first electrical signal indicative of at least one fuel delivery set point;
(b) memory means for receiving and for storing said at least one set point;
(c) means to generate a second electrical signal indicative of the instantaneous fuel delivery of said fuel pump;
(d) comparing means connected to said memory means and said means to generate said second electrical signal, for comparing said first and second signals, and for producing an error signal indicative of a difference between said first and second electrical signals; and
(e) means for applying said error signal to control the speed of the driving means.

The fuel pump is preferably a fuel injection pump and for testing purposes is mounted on a test bench and driven by a variable speed electric motor.

BRIEF DESCRIPTION OF THE DRAWINGS

The invention can be more fully understood from the following description thereof in connection with the accompanying drawings described as follows.

DESCRIPTION OF THE PREFERRED EMBODIMENTS

Throughout the following detailed description, similar reference characters refer to similar elements in all figures of the drawings.

Figure 1:
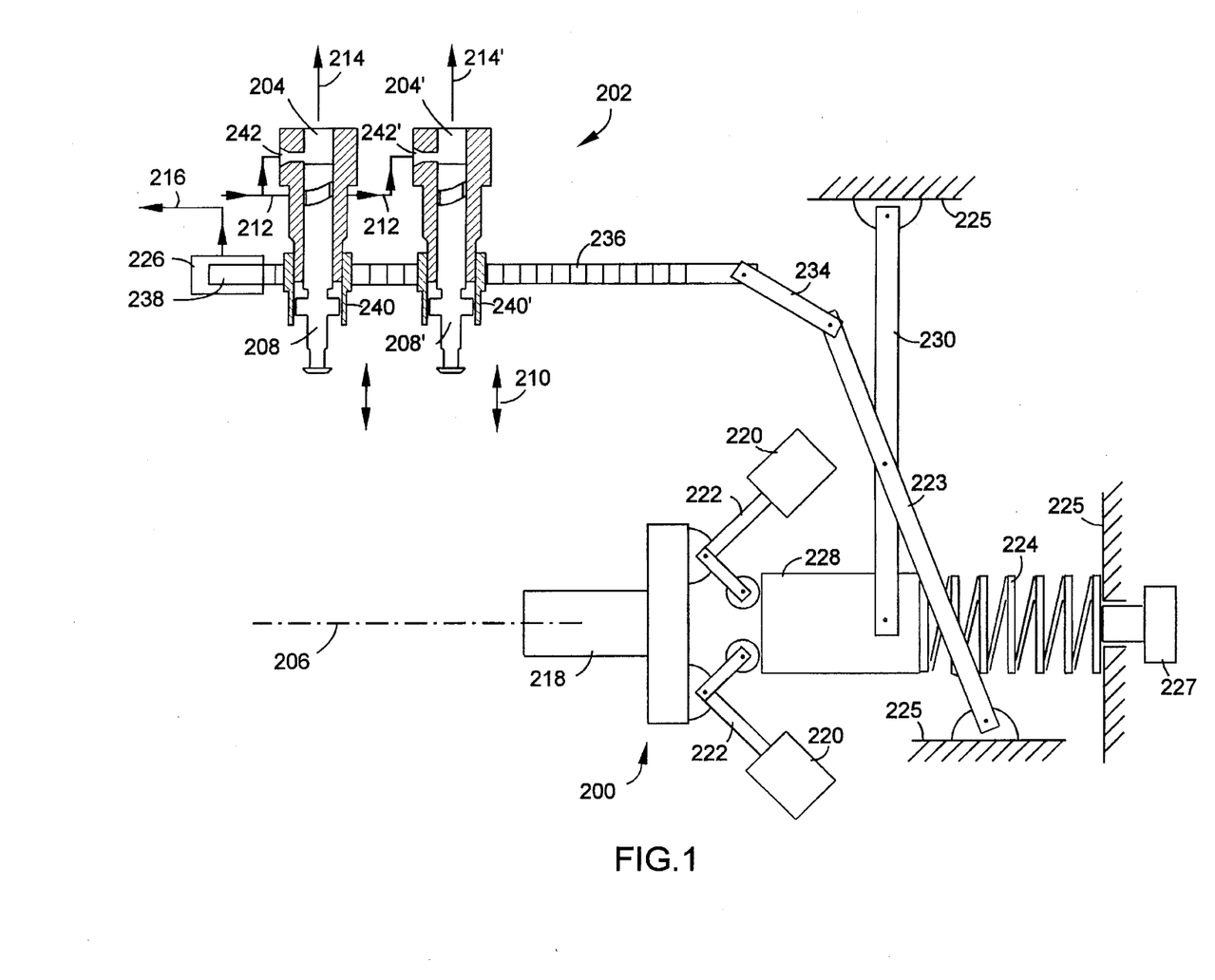
FIG. 1 is a schematic representation of a typical mechanical governor and associated pump.

Referring now to FIG. 1 there is shown a typical mechanical governor and associated fuel pump. The following description of this simple mechanical governor is provided herein by way of illustration rather than limitation, and other governors, including governors that employ electronics, both digital and analog, may be substituted as governors associated with fuel pumps for testing by the method and apparatus of the present invention.

The governor illustrated, generally identified as governor 200 in FIG. 1, controls a pump 202, which in this illustration comprises two chambers 204 and 204' delivering fuel to two injectors not shown, through fuel delivery paths 214 and 214'. Fuel is supplied to pump 202 from a fuel sump or tank, also not shown, through a fuel supply path 212.

The fuel enters each pump chamber 204 and 204' through a port 242 and 242' respectively. The typical pump provides for an adjustment mechanism so that the amount of fuel delivered with each pump stroke may be varied at will. In FIG. 1, the method for varying this fuel amount delivered per pump stroke is schematically illustrated by a tab 240 and 240' associated with each chamber which rides on a geared rack 236. The rack 236 is mounted so that it can be linearly displaced and the pump structure is such that linear movement of the rack rotates the tabs and results in altering the amount of fuel delivered by each chamber during each stroke. A typical such fuel pump and associated control is described in more detail in numerous manuals teaching diesel engine principles or repair, including the "Standard handbook for Mechanical Engineers" 7th Ed. by the McGraw-Hill Book Co. section 9-131, and a certain training manual entitled "Diesel Fuel Injection system" published by NIPPONDENSO Co., Ltd. particularly in section 6-4.

The pump includes plungers 208 and 208' driven in the direction of arrows 210 by a rotating cam shaft 206. Metered fuel delivery is accomplished with each revolution of the rotating shaft.

The governor 200 comprises a body portion 218 which is mounted so as to rotate with cam shaft 206. Weights 220 are mounted on articulated arms 222 which are attached to the governor body 218 and ride on a block 228. Block 228 is resiliently mounted via a spring 224 within a casing 225 surrounding the governor, shown only partially so as not to unduly clutter the illustration. Spring 224 is adjustable through a means 227 extending to the outside of casing 225, so as to apply a selectably variable amount of pressure to the articulated arms. In operation, as shaft 206 rotates, weights 220 due to the centrifugal force tend to move away from the rotating shaft, applying a force on block 228 tending to move block 228 along the axis of shaft 206. This force is counterbalanced by the pressure applied by the spring 224. The movement of block 228 is transferred via articulated arms 232, 234 and 230 to the rack 236 imparting linear translation to the rack which is related to the rotational speed, RPM, of the shaft 206 which drives both the governor and the fuel pump.

Thus, the fuel delivery to the injectors via the pump is controlled by the governor, and this control is adjustable by the setting of the counterbalancing force applied by the spring 224.

The above described operation of a governor and pump is well known in the art, and is solely provided here for purposes of facilitating the description of the present invention. There are other types of pumps and governors available in the art, and the invention is applicable to them as well. All that is required is that the governor control of the pump fuel delivery rate be adjustable, and that a signal indicative of the governor setting corresponding to such adjustment may be obtainable.

Such signal may be obtained in the governor/pump arrangement illustrated in FIG. 1, by attaching to the end 238 of rack 236 a position transducer 226, able to output an electrical signal over a line 216, such signal being indicative of the position of the rack.

In the preferred embodiment, this invention is best practiced using a commercially available fuel pump testing bench such as a Hartridge 2500 diesel fuel pump test stand manufactured by Lucas Assembly and Test Systems, Hartridge Test Products, A division of Lucas Automation and Control Engineering Ltd. or a Specialist 8015 Diesel Fuel Injection Pump Calibration stand manufactured by Bacharach inc. of Pitsburg, Pa. or any similar test bench. Such test benches typically provide a variable speed motor drive for the fuel pump and associated governor, means to mount the pump and governor on the bench test, a source of fuel and a sump for receiving fuel circulated through the pump, means to measure the motor speed in revolutions per minute, means to adjust and set the motor speed, and means to measure the quantity of fuel delivered through each pump chamber for a preset number of pump strokes.

Figure 2:
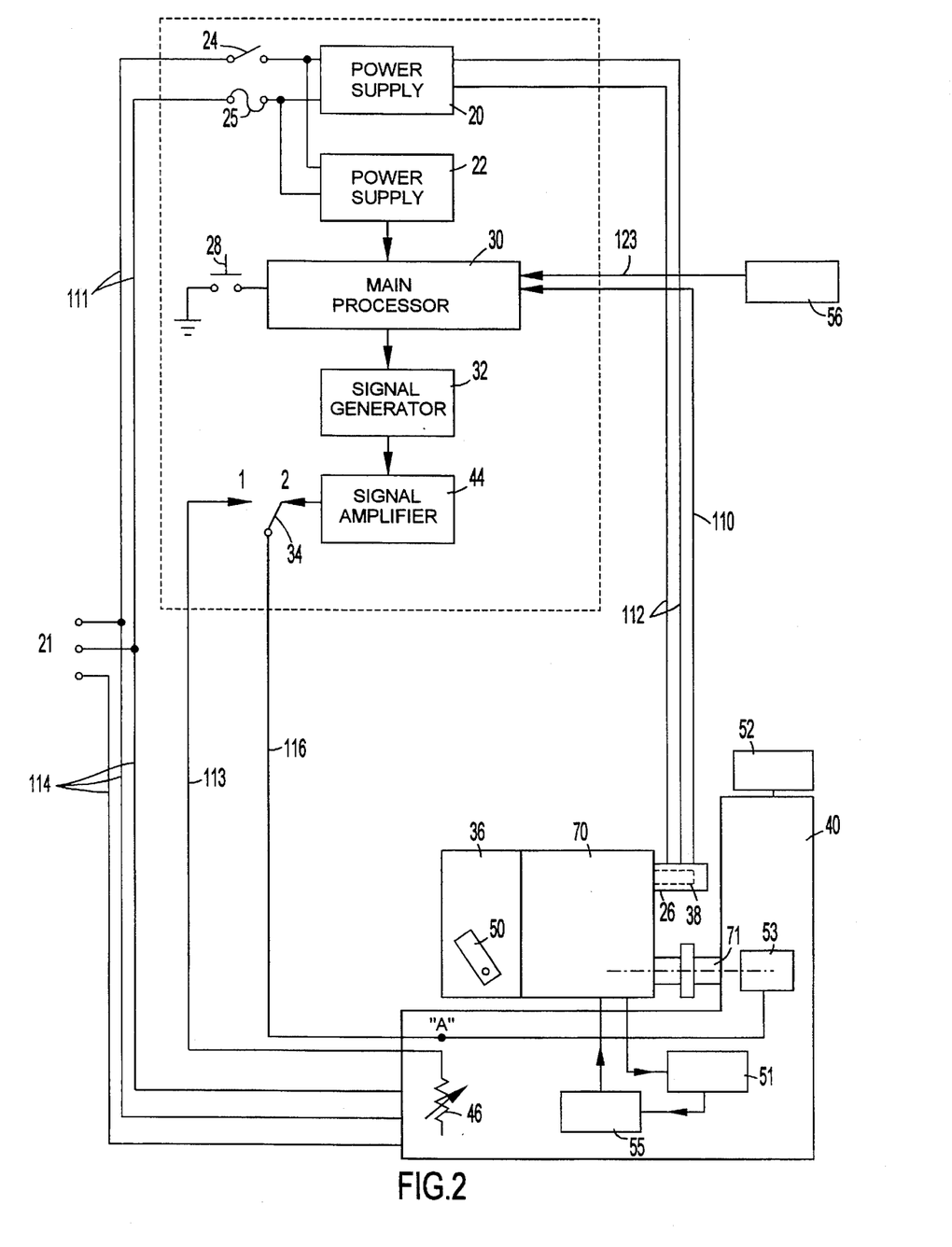
FIG. 2 is a schematic representation of a governor testing system depicting a governor and associated fuel pump mounted on a test bench in accordance with the present invention.

FIG. 2 shows schematically such a test bench 40 to which is connected a fuel pump 70 which typically is a high pressure fuel injection pump, and associated governor 36. The pump and governor assembly further includes a throttle control 50. The pump and governor are connected to a variable speed motor drive 53 in the test bench through a mechanical link 71. A tachometer 52 displays the instantaneous RPM of the variable speed motor drive. Means to vary the motor drive speed typically include a manual speed control such as a variable resistor 46 which is used to vary a voltage applied to the motor 53 in the test bench. It is understood that different motor speed controls may be used, which may control the current flow rather than the applied voltage to vary the motor RPM or which may control the frequency of the motor driving voltage, the pulse repetition rate of the driving voltage, or any other means. Such means are well known in the art and need no further elaboration here, the simple variable resistor being a sufficient illustration of at least one such motor speed variation means, sufficient for practicing the present invention.

The governor controls the pump output with a rack similar to the arrangement illustrated in FIG. 1. The end portion 38 of the rack is usually readily accessible. Attached to it there is shown a position transducer 26, which supplies an electrical signal over line 110, indicative of the position of the rack end 38. A power supply 20 supplies power (usually a regulated, low D.C. voltage in accordance with the transducer manufacturer specifications) to the transducer 26 over lines 112. Power to the power supply is usually a 115 Volt A.C. house line voltage source 21 provided over lines 111 and switch 24. A fuse 25 may be used to protect this circuit as is well known in the art.

The output of the transducer 26 is a continuous electrical signal which is indicative of the position of the end 38 of the rack and therefore of the amount of fuel delivered per pump stroke since it is the rack position that determines the amount of fuel delivered by each pump chamber during each pump stroke. This signal is applied over line 110 to a main processor 30. The main processor 30 includes a memory and a comparator circuit. The main processor may be a digital system or an analog system, or a combination of the two.

The main processor receives a first electrical signal representing the continuing signal from the position transducer and on command stores in its memory a momentary value of this first signal representing the continuing signal value at a selected moment. A switch 28 illustratively represents a means by which a momentary signal value may be stored in the memory of main processor 30.

This first electrical signal is indicative of a pump setting and a corresponding quantity of fuel delivered per stroke and once it is stored it becomes a fuel delivery pump set point. The main processor now continues to receive the continuing signal from the transducer, as a second electrical signal indicative of the instantaneous fuel delivery of the fuel pump, compares it to the stored first electrical signal representing the stored set point, and generates an error signal indicative of a difference between the stored set point and the second electrical signal.

The main processor 30 memory is preferably capable of storing more than one set points, and the comparator in the main processor, also preferably, is able to compare the second electrical signal indicative of the instantaneous fuel delivery of the pump signal with any selected one of the plurality of set points stored in the memory. The main processor may also be programmable and programmed to switch set points in a preselected manner or on command from an external signal. It is particularly useful to have a main processor able to switch set points each representing various engine load conditions. It is also advantageous to provide a main processor able to be preprogrammed from an external source 56 over line 123 with set points if so desired.

The main processor 30 may be a general purpose computer suitably programmed with software to perform the storing, retrieving and comparing functions, or may be a dedicated processor programmed internally for performing the same functions, or finally it can comprise discreet hardware designed to perform the above functions. The technology for achieving these functions is well known, and the basic functions of generating a signal, establishing and storing a set point and comparing a position signal with the set point is readily available and often found in commercially available industrial controllers such as the Universal controller made by Jumo Process Control Inc. with offices in Coatsville Pa. As will be discussed below in more detail, an external input device 56 may optionally be used to address the main processor.

The error signal from the main processor is then preferably applied to a signal generator 32. Signal generator 32 produces a driving signal for the motor drive which increases, decreases, or remains fixed, depending on whether the error signal input increases, decreases or is zero. The output is then, after amplification in signal amplifier 44, applied through terminal 2 of switch 34 and line 116 to point "A" on the test bench 40.

Point "A" on the test bench is the connection point for applying power to the motor drive 53 of the test bench, and the speed of the motor drive is controlled by the applied voltage at "A".

Terminal 1 of switch 34 is connected over line 113 to the output of the manual speed control 46. The other end of the manual speed control 46 receives power from the power source of the motor drive provided by the test bench. The details of this internal power source are not shown in the figure as they have no bearing on this invention and are well known in the art. It is thus seen that when switch 34 is in position 1, the test bench motor drive is controlled manually by the test bench manual control system, and that when switch 34 is in position 2, the test bench motor drive is controlled by the main processor 30 through the feedback loop comprised of the governor rack end 38, the transducer 26, the signal generator 32 and the signal amplifier 44.

Line power, 115 Volts A.C. is applied to the test bench through lines 114. An optional power supply 22 may be provided to supply power to the main processor, if such is needed. Signal generator 32 and signal amplifier 44 may or may not be needed, depending on the type of error signal output from the main processor and motor drive requirements. It is however usually the case that the voltage needed to drive the drive motor in the test bench will be different from the error signal output of the processor, in which case such error signal will have to be converted to a motor drive signal useful for driving the test bench motor drive. The signal generator and amplifier perform this conversion.

The test bench also includes a source of fuel 55 which is connected to the pump 70, and a sump 51 to receive the fuel pumped through the pump. Typically the sump 51 includes measuring and display means for observing the fuel quantity delivered by the pump over a predetermined number of pump strokes.

Figure 3:
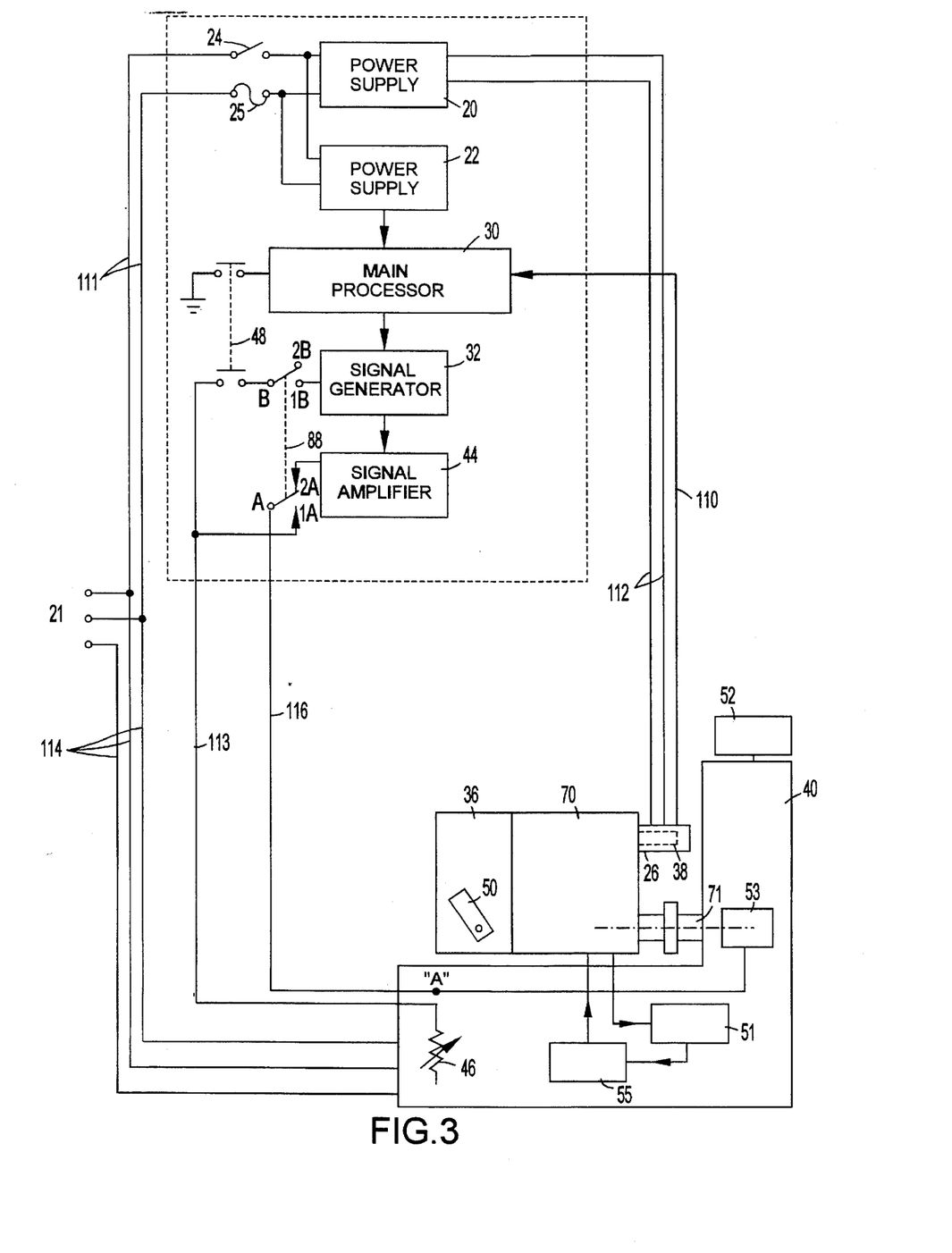
FIG. 3 is an alternate embodiment of the system depicted in FIG. 2

FIG. 3 shows a modified version of the test arrangement shown in FIG. 2, wherein the switching set up for switching between manual operation and automatic operation following establishment of a set point is modified to permit to initialization of the system using data directly from the manual speed control.

In the modified circuit of FIG. 3 switches 34 and 28 are replaced by switches 88 and 48 respectively. The output of manual control 46 is directed over line 113 to signal generator 32 through two switches, switch 48 and switch 88. When switch 48 closes to store the set point in the main processor memory, the output from speed control 46 appears to the input of one of two inputs of switch 88, input "b". When switch 88 is in the "off" position, input "b" is connected to output 1b and input "a" is connected to output 1a.

When switch 48 closes, the output of speed control 46 is applied to the signal generator, where it is used as an initialization value to produce an initial signal generator output. After switch 88 is switched from the "off" position to the "on" position, as shown in FIG. 3, the output of speed control 46 is isolated from the input of signal generator 32. At the same time, switch 88 disconnects line 116 from line 113 as the switch wiper goes from contact 1a to contact 2a and applies the output of the signal amplifier 44 through line 116 to point "A" on the test bench.

Figure 4:
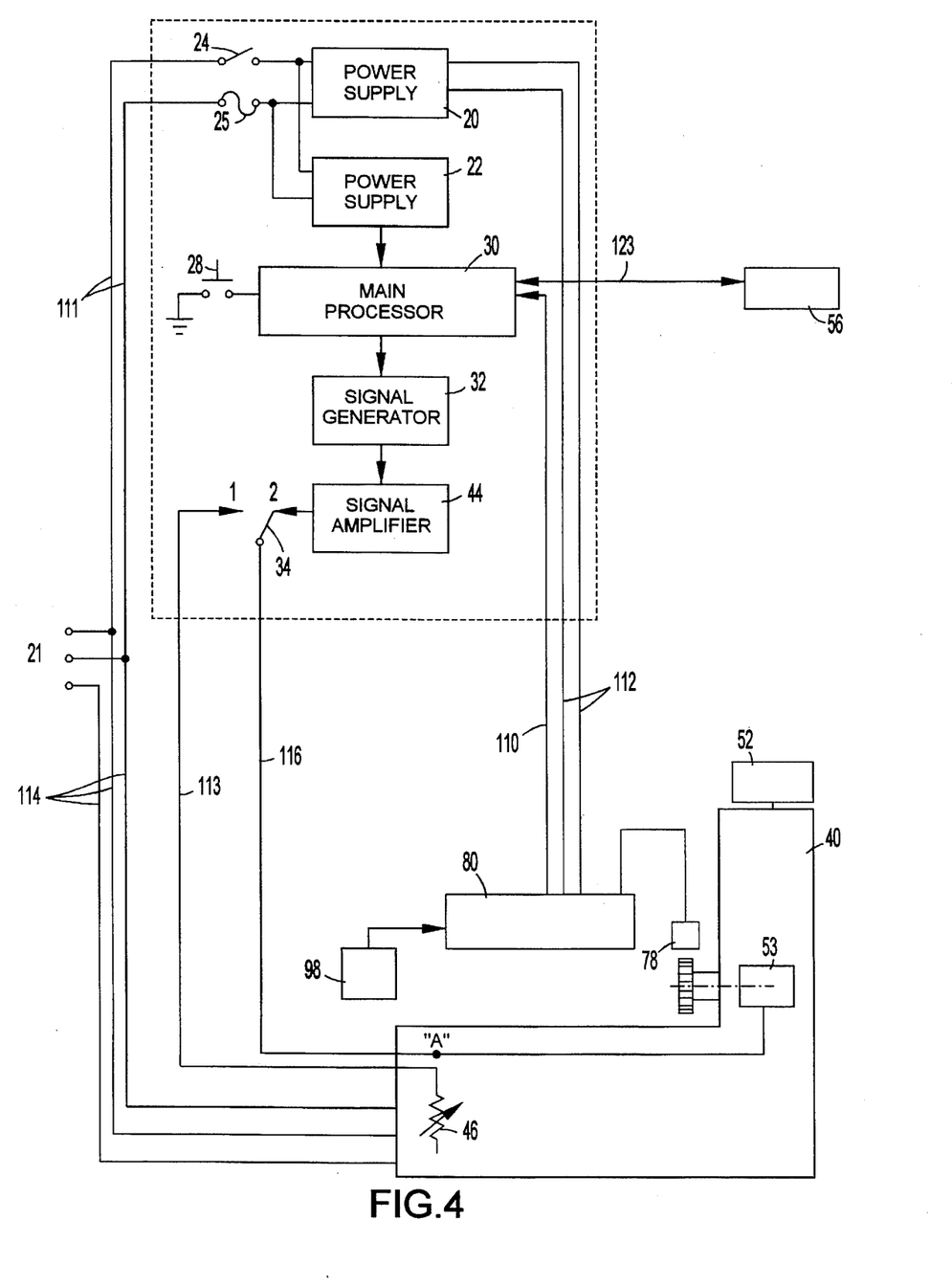
FIG. 4 is yet another embodiment of the present invention in which a system for testing electronic governors is depicted.

FIG. 4 shows yet another embodiment of this invention particularly suited for testing electronic governors particularly electronic governors which derive their speed input not from direct mechanical coupling to a rotating shaft, but from an electrical signal indicative of such rotation and are physically removed from the fuel injection pumps. Fuel delivery control is accomplished remotely with an electronic signal.

As shown in FIG. 4, an electronic governor 80 is connected to a test bench 40 using a pick up transducer 78 which provides a signal indicative of the speed of rotation of the motor drive 53 in the test bench in a format acceptable as an input to the electronic governor. An electronic throttle control 98 is used to change the governor speed, much as the mechanical throttle 50 shown in FIG. 1 changes the mechanical governor's speed. The electronic governor produces a pump control signal which controls the effective pump stroke, that is the time period in each pump cycle during which fuel is delivered to the injectors and thus the amount of fuel delivered per pump stroke and corresponds to the signal generated by the position indicator transducer 26 shown in FIG. 2 and 3. This pump control signal is applied over line 110 to the main processor 30 and is the second electrical signal referred to earlier.

The main processor 30 in this arrangement also includes an external input device 56 which may be a keyboard, through which data representing desired set points for the fuel injection pump for different operating conditions of an engine are input and stored in the main processor memory. The main processor memory preferably can store more than one set point. The set points representing quantity of fuel delivered by the pump for pump stroke for particular engine operating conditions, may preferably be provided by the pump manufacturer, or may be derived independently at a different time by experimentation or measurement of actual quantity of fuel delivered for given throttle settings and engine loads. Typically the set points are applied to the main processor comparator as an electrical signal similar to the control signal produced by the electronic governor to control the effective pump cycle.

The keyboard allows selection of a desired set point for use by the main processor for a particular test. Selecting of a set point from the main processor memory in this configuration produces a signal in the main processor that is the equivalent to the first electrical signal stored in the main processor in the configuration for testing mechanical governors discussed earlier.

Figure 5:
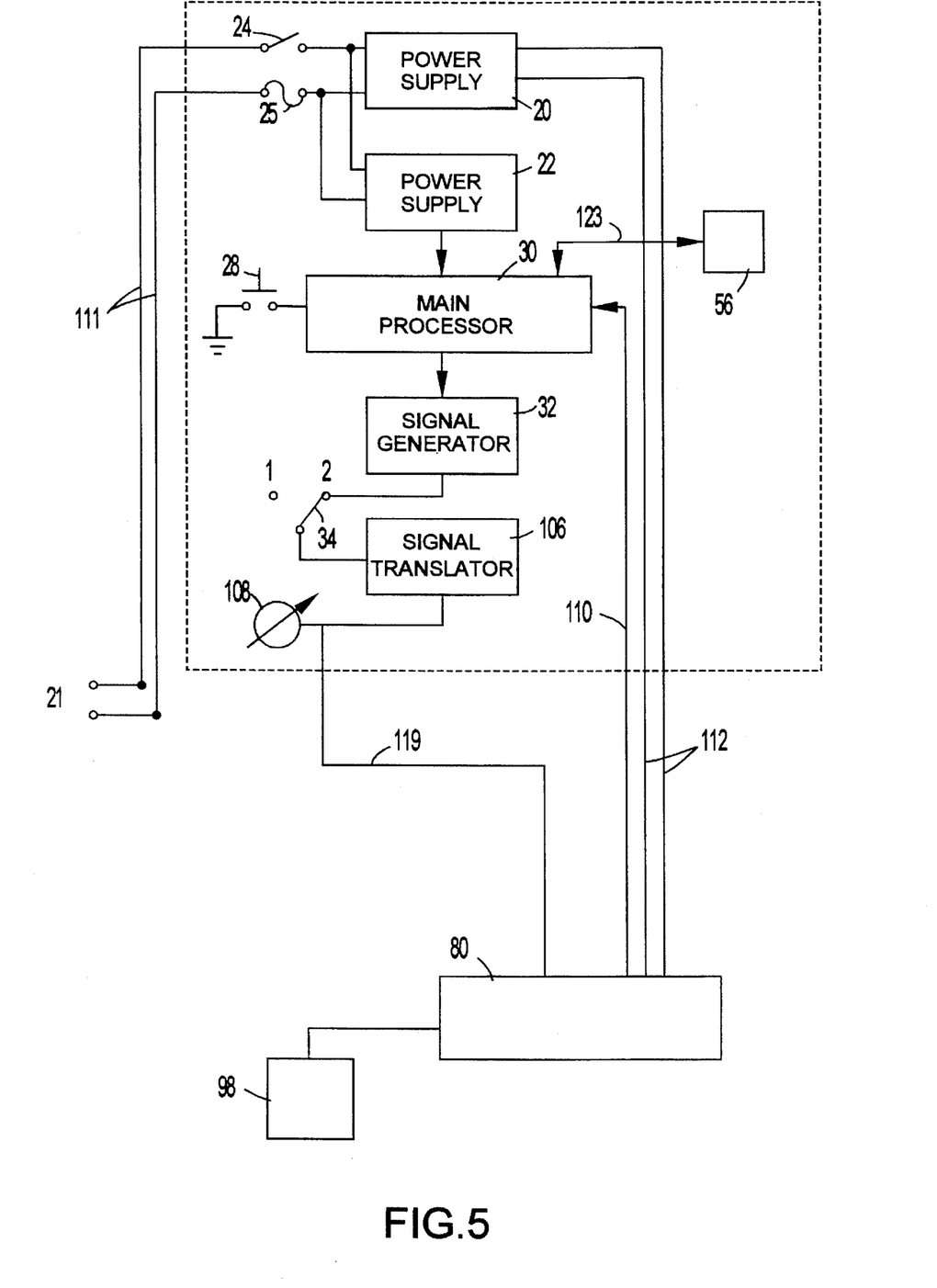
FIG. 5 is still another system implementing the present invention without the use of a test bench.

FIG. 5 shows still another embodiment of the present invention which may be used for testing an electronic governor 80 without using a test bench. The electronic governor again includes a throttle 98.

The main processor 30 again includes an external input device 56 and can store multiple set points. In addition to the memory means, it again also includes comparator means for comparing a second electrical signal applied to the main processor over line 110. The comparator output representing a difference between the first electrical signal representing the selected set point and the second electrical signal, is used to drive signal generator 32 to produce an output signal which is applied to a signal translator 106 through switch 34. Signal translator 106 reads the output signal from the signal generator and from this produces an output signal representing the speed signal that would normally be sent to the electronic governor in an actual engine mounted set up. In a preferred embodiment, this signal translation can be accomplished using a look up table which correlates signal generator output to electronic governor input. The signal translator may also be a voltage to frequency converter.

The output of signal translator 106 is comparable to the output of the transducer 78 used in the embodiment of FIG. 4, where a test bench is used in testing electronic governors. An RPM indicator 108 provides a visual indication of the engine RPMs.

The output of the signal translator represents the engine RPMs, but in a form that is acceptable for use by the electronic governor 80. It is fed to the speed input of the electronic governor 80 over line 119. The electronic governor in turn outputs over line 110 a control signal for controlling the injection pump, in the same manner as it would, should the governor and pump had been operating mounted on an actual engine. This control signal is the second electrical signal which is supplied to the main processor over line 110.

The availability of the feedback loop permits one to accurately test and set governors by simulating the actual effect of the governor control on the pump under both steady state and transient conditions. In discussing such use and the resulting method for testing governors according to this invention, reference is made to FIGS. 1, and 2.

A mechanical governor and associated pump assembly of the type shown in FIG. 1 is mounted on a test bench of the type shown in FIG. 2 as bench 40. The main driving shaft (206 FIG. 1) driving the governor/pump assembly (36 and 70 in FIG. 2) is attached to the bench via coupling 71. Fuel lines connecting the fuel supply 55 and fuel sump 51 to the pump are connected to the pump.

Switch 34 is first placed in position 1 and power is applied to the system. Potentiometer 46 is adjusted to drive the motor 53 at a specified RPM. Preferably the specified RPMs correspond to operating the diesel engine at what is known in the trade the "Low Idle" point, a condition in which the engine is running without external load with the throttle placed against a low speed stop.

Throttle 50 is set all the way back to a position corresponding to the low idle setting. As a result, spring 224 is adjusted so that the quantity of fuel delivered by the pump over a predetermined number of strokes, which in this case correspond to a predetermined number of revolutions of the motor drive corresponds to the manufacturer's specifications.

Having thus established an operating point, that is driving the pump under manual control at a given RPM and having the throttle and spring pressure at predetermined position and force, the set point switch is actuated and a "low idle" set point is stored in the memory of the main processor. This set point corresponds to a first electrical signal received by the main processor which in this instance is the rack 38 position transducer output at the time of actuating the switch 28.

Switch 34 is next switched from position 1 to position 2 switching the control of the motor drive from manual to the output of amplifier 44 and introducing a feed back loop in the system, the feedback loop being the position sensor 26, the main processor 30, the signal generator 32 and the signal amplifier 44. The comparator in the main processor continuously compares the signal from the position transducer 26, with the first signal representing the set point stored in the memory. The signal from the transducer is now referred to as a second electrical signal to distinguish it from the earlier, first signal that was used to determine a set point.

So long as the two signals are the same there is no difference signal and the signal generator produces an output which after amplification in amplifier 44 (an optional step as already mentioned) is the same as the manually set output from potentiometer 46. This output, drives the motor drive 53 at the same speed as the speed set manually according to the manufacturer's specifications for the low idle setting. However the motor drive is now controlled by the governor rather than the manual speed control, and is subject to governor malfunction.

When there is malfunction in the governor, such as possibly a slow drift in the spring force setting, or pulsation of the rotating weights, the steady state operation described above is disturbed. Let us assume that the block 228 moves slightly back and forth in an axial direction as the weights turn. The result is a movement in the rack end 38 (FIG. 2) which is picked up by transducer 26 and transmitted to the main processor as a change in the second electrical signal. This change generates a difference signal in the comparator, positive or negative, which is directed to the signal generator increasing or decreasing the signal strength of the signal sent to the amplifier, and as result increasing or decreasing the RPMs of the motor drive, simulating the effect of increased or decreased fuel supply to the engine as a result of altering the fuel delivery adjustment of the pump due to the movement of the rack. This is apparent by observing the tachometer reading.

This type of problem, referred to as "hunting", is difficult to detect on the test benches of the prior art, because the pump drive is not controlled by the governor but is manually set at a given rate. Further more, if the governor instability is oscillatory in nature, the average fuel quantity delivered by the pump after 500 or 1000 strokes tends to average such fluctuations in fuel delivery and mask the problem. This type of problem is readily observed using this invention, by observing any variations in the motor drive RPMs on the test bench RPM indicator 52.

When using the apparatus depicted in FIG. 3, the output of the manual speed control 46 is used to provide a signal to the signal generator indicative of the motor speed at the time of establishment of the set point. Switch 88 is first placed in position 1 connecting inputs "a" and "b" to outputs 1a and 1b. The bench motor drive is under manual control through potentiometer 46, the output of which is applied to the drive through switch 88 terminals "1a" and "a". A set point is established by closing switch 48 while switch 88 is still in position 1 and simultaneously the manual control voltage output from potentiometer 46 is applied to the signal generator to provide an initial value. This initial value is used in the generator to supply a signal to the amplifier such that the amplifier output is the same as the output manual signal. When the switch is moved to position 2, this signal is applied to the motor drive 53 through terminals "2a" and "a" of switch 88 effectively maintaining the same initial conditions as at the time of the switching over of the motor drive from manual to feed back control. An error signal resulting from any in the position of the rack tip 38, will, as described earlier, produce a difference signal in the main processor which is also applied to the signal generator and where it is combined, as by summing, with the initialization signal to generate a control signal which ultimately controls the speed of rotation of the motor drive as also described earlier.

Testing electronic governors using a test bench arrangement as shown in FIG. 4, is the same as for the mechanical arrangement described in conjunction with the operation of the set up shown in FIG. 2. However, this system differs in that the first electrical signal for a given set point is obtained by direct input from information retrieved from a data bank, using some form of external device to address the data bank. The data bank itself can be in the main processor memory, having been placed there at some time prior to the test, or it can be external to the main processor, and an individual set point can be sent to the main processor through the external input device, i.e. the keyboard 56. Once the set point is in the main processor memory the testing proceeds as before.

In testing electronic governors as shown in FIG. 5, the operation is similar to that used in conjunction with FIG. 4, however the test bench is simulated by signal translator 106.

According to this invention, a plurality of tests may be performed, giving an accurate image of the governor operation under dynamic, i.e. changing conditions. It has been surprisingly found that a single set point established for a "low idle" throttle position is sufficient to test the operation of the governor for a plurality of throttle settings.

This is because a diesel engine operating under governor control, after reaching steady state following a change in speed due to a change in the throttle position, stabilizes at a pump set point that delivers about the same fuel quantity per stroke for all throttle control settings.

It has been observed that as the throttle is moved to increase speed, the rack end is first moved in a direction to increase the fuel delivered by the pump. This results in increased RPMs by the engine. As the RPMs increase, the governor reaches a point where the centrifugal forces on the rotating weights overcome the spring force and the rack is brought back decreasing the pump output to a steady state condition for the new throttle setting. This setting was found to be surprisingly close to the "low Idle" setting showing that the constant load steady state delivery rate changes very little for all engine RPMs. Thus testing governors including testing for performance parameters such as stability, speed droop, sensitivity, response, acceleration, deceleration, is possible according to one aspect of this invention, with adequate precision for all throttle settings using only one set point, preferably the set point established for the "low Idle" throttle setting.

When the governor is tested on the apparatus of this invention, the engine speed increase represented here by the motor drive on the test bench, and the effect of the speed increase on the governor is accurately simulated by the feed back loop which includes the changes in the governor or throttle position affecting the position of the rack end changing the motor drive which influences the governor in a manner similar to the actual throttle and governor operation on an actual diesel engine. Thus the apparatus according to this invention allows an accurate dynamic testing of a governor and associated pump as the throttle is increased as when accelerating or decreased as when decelerating.

The memory included in the main processor is preferably able to store a plurality of set points, and to recall a particular set point on demand, each set point corresponding to a specific engine load condition. The set point used in the above description of the testing method under this invention, represents a no-load operating condition of the engine; however, other set points may be used, representing part load, full load, peak torque, overload, or even negative load, as for an engine on a vehicle going downhill. The governor operation may be tested for any, or all of the above conditions using the corresponding set point.

Thus, while all this testing may be done with a single set point as discussed earlier, it is still contemplated under this invention, for cases where it is desired to obtain results with higher accuracy than what is obtained when testing using a single test point, to store more than one set point corresponding to different engine RPMs. Such set points defining a speed related steady state curve, representing a change of the steady state set point as a function of operating RPMS.

In taking advantage of this invention, the governor may be tested sequentially for multiple operating points by placing the throttle sequentially at different settings, and observing variations in the motor RPMs for the different set point settings.

When a programmable computer is used for the main processor, having the optional ability to introduce set points through a keyboard, testing of governor in accordance with the present invention may be done by establishing the set points by external input rather than through the use of the first electrical signal and the operation of the switch 28 as discussed earlier. In this case, the position transducer 26 output signal becomes the second electrical signal that is compared with the pre-established set point after the switch 34 is switched from position 1 to position 2 introducing the feed-back circuit into the motor drive. When a computer is used, a program may be provided for switching the set points automatically to automatically run a multiplicity of tests.

In the above description the control of the speed of the motor drive in the test bench is accomplished by varying the value of the driving voltage applied to the motor drive. This is only done for purposes of explaining the principle of operation of the apparatus according to this invention, and it is understood that the specific requirements of the motor drive of a particular test bench will dictate the type of signal that will be produced by the signal generator 32 such signal being the necessary type signal to drive the particular motor drive on a specific test bench.

Those skilled in the art having the benefit of the teachings of the present invention as hereinabove set forth, can effect numerous modifications thereto. These modifications are to be construed as being encompassed within the scope of the present invention as set forth in the appended claims.

I claim:

1. Apparatus for testing a diesel engine governor associated with a fuel pump having adjustable fuel delivery, said governor having an output for adjusting the fuel delivery of said pump, the apparatus comprising:
   (1) a variable speed pump driving means for driving said fuel pump and associated governor at variable speeds;
   (2) a means for connecting said fuel pump and governor to said pump driving means;
   (3) a display means for observing the speed of the pump driving means;
   (4) a manual control means having an output for adjusting the speed of the variable speed pump driving means;
   (5) a means for generating first electrical signals representing at least one fuel delivery set point;
   (6) a memory means for receiving and for storing said first electrical signals representing said at least one set point;
   (7) a feed back loop comprising:
      (a) a means for generating second electrical signals representing an instantaneous output of the governor to said fuel pump;
      (b) a comparator connected to said memory means and said means for generating said second electrical signals, for comparing said first and second signals, and for producing an error signal indicative of a difference between said first and second electrical signals; and
      (c) a means for applying said error signal to the variable speed pump driving means; and
   (8) a switching means for connecting the pump driving means selectably between:
      (i) said manual control means output; and
      (ii) said means for applying said error signal to the variable speed pump driving means.

2. Apparatus according to claim 1 wherein the means for generating the first and the second electrical signals are a single means continuously producing an electrical signal representing the output of the governor and wherein the apparatus further comprises means for selectively applying and storing in said memory means an instantaneous value of said electrical signal for use as a set point.

3. Apparatus according to claim 1 wherein the means for generating a first electrical signal comprises external input means for loading a preselected set point in said memory means.

4. Apparatus according to claim 1 wherein the means for generating a first electrical signal comprises external input means for loading a preselected plurality of set points in said memory means.

5. A test bench for testing a diesel engine governor associated with a fuel pump having adjustable fuel delivery, said governor having an output for adjusting the fuel delivery of said pump, the test bench comprising:
   (1) a variable speed electrically operated motor for driving said fuel pump and associated governor;

(2) a means for connecting said fuel pump and governor to said motor for driving said fuel pump and said governor at a speed;

(3) a display means for observing the speed of the fuel pump;

(4) a manual control first voltage source having an output for adjusting the speed of the variable speed motor;

(5) a means for generating first electrical signals representing at least one fuel delivery set point;

(6) a memory means for receiving and for storing said first electrical signals representing said at least one set point;

(7) a feed back loop comprising:
  (a) a means for generating second electrical signals representing an instantaneous output of the governor to said fuel pump;
  (b) a comparator connected to said memory means and said means for generating said second electrical signals, for comparing said first and second signals, and for producing an error signal indicative of a difference between said first and second electrical signals; and
  (c) a second voltage source having an input for receiving said error signal and an output for adjusting the speed of the variable speed motor; and (8) a switching means for connecting the pump driving means selectably between:
  (i) said first voltage sources output; and
  (ii) said second voltage source output.

6. Apparatus for testing a diesel engine electronic governor associated with a fuel pump having adjustable fuel delivery, said governor having an input for receiving an electrical signal representing a diesel engine speed, and an output for adjusting the fuel delivery of said pump, the apparatus comprising:

(1) a variable speed driving means for driving said pump at variable speeds;

(2) a display means for observing the speed of the driving means;

(3) a manual means having an output for adjusting the speed of the variable speed driving means;

(4) a means for generating first electrical signals representing at least one fuel delivery set point;

(5) a memory means for receiving and for storing said first electrical signals representing said at least one set point;

(6) a feed back loop comprising:
  (a) a pick-up speed transducer means connected to said governor input and said driving means for producing said electrical signal representing said engine speed to said governor input;
  (b) a means for generating second electrical signals representing an instantaneous output of the governor to said fuel pump;
  (b) a comparator connected to said memory means and said means for generating said second electrical signals, for comparing said first and second signals, and for producing an error signal indicative of a difference between said first and second electrical signals; and
  (c) a means for applying said error signal to the variable speed driving means; and (8) a switching means for connecting the driving means selectably between:
  (i) said manual control means output; and
  (ii) said means for applying said error signal to the variable speed driving means.

7. Apparatus for testing a diesel engine electronic governor associated with a fuel pump having an adjustable fuel delivery, said governor having an electrical output for adjusting the fuel delivery of said pump and an input for receiving an electrical signal representing engine speed, the apparatus comprising:

(1) means for connecting said electronic governor to said testing apparatus;

(2) means including memory means, for generating and storing a first electrical signal representing at least one set point corresponding to a recommended governor output for controlling said fuel pump delivery;

(3) comparing means connected to said memory means and said electronic governor output, for comparing said first signal and said second electrical signals, and for producing an error signal indicative of a difference between said first and said second signals;

(4) means for converting said error signal to the engine speed signal and for applying the engine speed signal to the input of the governor; and (5) means for observing the engine speed signal.

8. Apparatus according to claim 7 wherein the means for generating a first electrical signal comprises external input means for loading a set point in said memory means.

9. Apparatus according to claim 7 wherein the means for generating a first electrical signal comprises external input means for loading a preselected plurality of set points in said memory means.

10. A method for testing a diesel engine governor associated with a fuel pump having adjustable fuel delivery, said governor having an output for adjusting the fuel delivery of said pump, the method comprising:

(1) connecting said fuel pump and associated governor to a means for driving said pump and associated governor at a variable speed determined by said driving means;

(2) operating said means for driving said pump and governor in a first, manually controlled driving mode, and adjusting said governor output to set the fuel delivery rate of said pump in accordance with a predetermined specification;

(3) deriving a first electrical signal representing said governor output;

(4) storing said first electrical signal;

(5) operating said means for driving the pump and governor in a second, automatic, feedback mode by:
  (a) continuously deriving second electrical signals representing the instantaneous governor output;
  (b) comparing said first and second signals to produce an error signal; and
  (c) applying said error signal to the means for driving the pump and governor;

(6) varying the speed of driving said pump and governor at a rate determined by the error signal; and (7) Observing said variation of the speed of driving said pump and, optionally, said error signal, to diagnose a malfunction.

11. A method in accordance with the method of claim 10 wherein the governor is an electronic governor and wherein steps (2) and (3) are omitted, and the governor output setting the fuel delivery rate of said pump is set in accordance with a predetermined specification.

12. A method in accordance with the method of claim 10 wherein steps (2), (3), and (4) are repeated a plurality of times to derive a plurality of different first electrical signals and wherein in step (5b) said plurality of first signals is sequentially compared with said second signals and wherein step (7) comprises observing said variation of speed for each of said plurality of first signals.

13. A method in accordance with the method of claim 10 wherein the governor includes a throttle and the test includes the additional step of repeating steps (5) through (7) for different governor throttle positions.

14. A method in accordance with the method of claim 10 wherein in step (2) the preselected specification is provided by a manufacturer and the observation of speed variation in step (7) is used to measure the performance, and to adjust the governor in accordance with said manufacturer's specification.

15. A method in accordance with the method of claim 11 wherein in step (2) the preselected specification is provided by a manufacturer and the observation of speed variation in step (7) is used to measure the performance, and to adjust the governor in accordance with said manufacturer's specification.

* * * * *